(12) United States Patent
Wright

(10) Patent No.: US 7,960,165 B2
(45) Date of Patent: Jun. 14, 2011

(54) METHOD AND APPARATUS FOR DRYING ORGANIC MATERIAL

(76) Inventor: James Wright, Maple (CA)

( * ) Notice: Subject to any disclaimer, the term of this patent is extended or adjusted under 35 U.S.C. 154(b) by 1058 days.

(21) Appl. No.: 11/565,059

(22) Filed: Nov. 30, 2006

(65) Prior Publication Data

US 2007/0144062 A1    Jun. 28, 2007

Related U.S. Application Data

(60) Provisional application No. 60/741,072, filed on Dec. 1, 2005.

(51) Int. Cl.
*B09B 3/00* (2006.01)
*C12M 1/00* (2006.01)
*C12M 1/02* (2006.01)

(52) U.S. Cl. ........... 435/262.5; 435/290.1; 435/290.2

(58) Field of Classification Search .......... 71/8, 9, 71/10; 435/262.5
See application file for complete search history.

(56) References Cited

U.S. PATENT DOCUMENTS

| | | |
|---|---|---|
| 3,910,775 A | 10/1975 | Jackman |
| 4,198,211 A * | 4/1980 | Shattock ............ 48/197 A |
| 4,254,716 A | 3/1981 | Graham |
| 4,496,365 A | 1/1985 | Lindemann |
| 4,957,049 A | 9/1990 | Strohmeyer, Jr. |
| 5,409,831 A | 4/1995 | Wright |
| 5,551,969 A | 9/1996 | Wright |
| 5,846,815 A | 12/1998 | Wright |
| 6,824,682 B2 * | 11/2004 | Branson ............ 210/603 |
| 7,211,429 B1 * | 5/2007 | Rudas ............ 435/262 |
| 7,285,141 B2 * | 10/2007 | Arai et al. ............ 44/589 |
| 7,744,671 B1 * | 6/2010 | Ouellette ............ 71/9 |

* cited by examiner

*Primary Examiner* — Wayne Langel
(74) *Attorney, Agent, or Firm* — Dinesh Agarwal, P.C.

(57) ABSTRACT

Organic waste having a moisture content of about 65% is dried to a level of dryness by applying heat generated by microbial action on the waste organic material to dry that material to usable levels of about 20% moisture. Method of the present invention is more efficient and economical for the drying of waste materials to combustible fuel than conventional drying methods and apparatus. Preblended portions of the organic material are deposited sequentially into a fermentation zone of a chamber and hot exhaust gases generated by the fermentation process are passed through an air-to-air heat exchanger along with cooler ambient intake air which is in its turn heated and turned back on the waste material in the second drying stage.

6 Claims, 4 Drawing Sheets

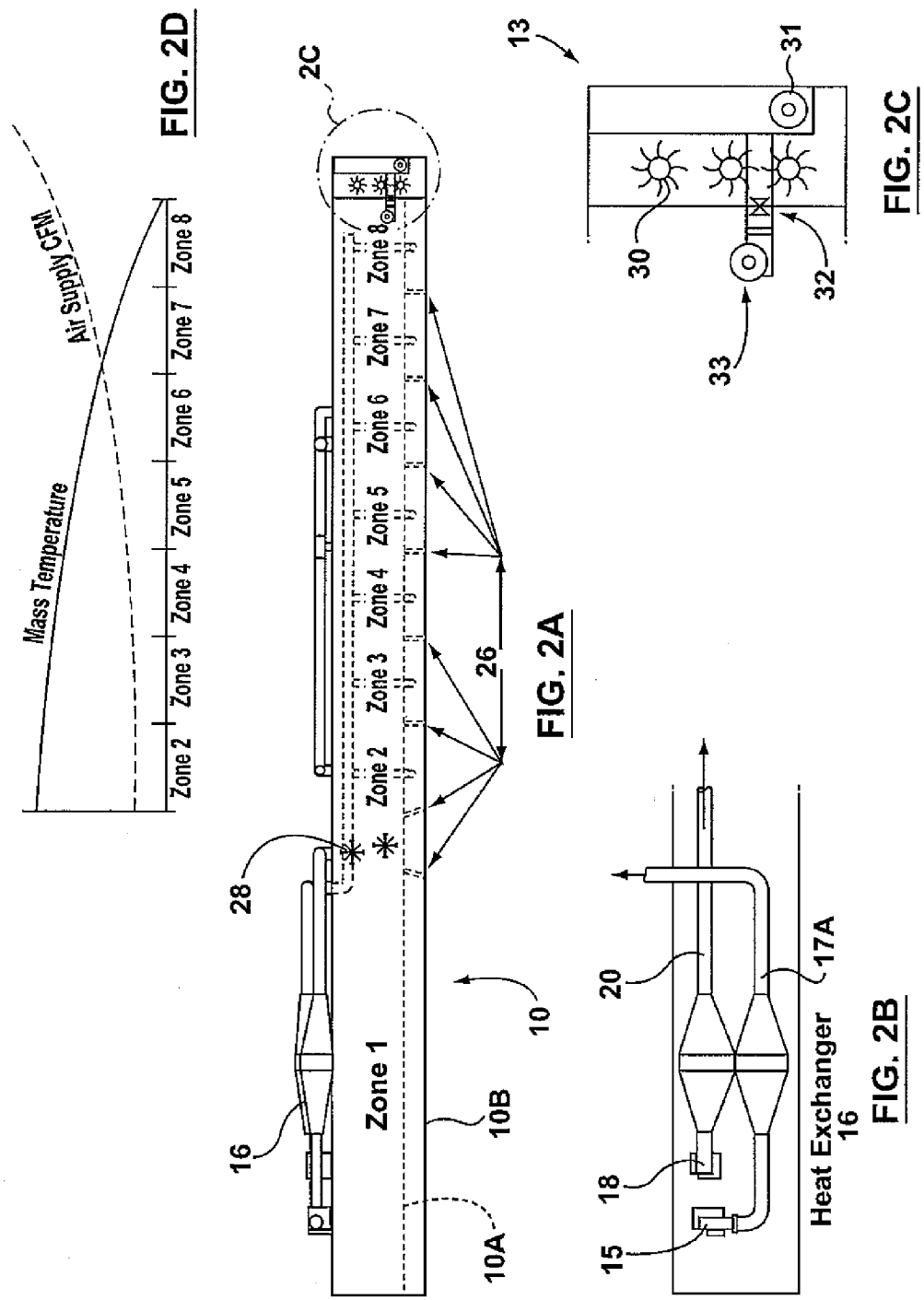

METHOD AND APPARATUS FOR DRYING ORGANIC MATERIAL

BACKGROUND OF THE INVENTION

This invention relates to a method and apparatus for biologically and mechanically drying organic material such as garbage, waste, sewage, pulp sludge, food, manure, renderings, wood, agricultural waste, bagasse, peat, mash, silage, biomass, feedstock, etc., particularly for the preparation of a useful fuel but also for products such as DDGS (Distillers Dried Grains with Solubles) or other valuable Nutraceuticals or feed.

A number of attempts have been made to dry wet organic materials and wet biomass into a sufficiently dry state to be useful as combustible solid fuel. A number of these involve the direct application of externally generated heat to the raw material, for example by the use of rotary and other dryers. In the method and apparatus for preparing organic waste fuels which is the subject of U.S. Pat. No. 4,254,716 (Graham) a dryer, either of a single or multiple pass, or fluid bed design makes use of hot flue gases from an energy recovery boiler.

However, known methods for drying wet organic materials are impractical for preparing useful fuels by reason of their inherent inability to reduce the water content of the organic waste to a sufficiently low level in an energetically economic way. The water content of the dried organic waste must be brought down to about 20%, and to do so conventional processes consume undue amounts of energy (fossil fuel, electricity). Consequently, the end product is not commercially useful as a fuel in competition with substances such as coal, etc.

Methods of making combustible briquettes or pellets from waste products using mechanical means (belt presses, screw presses, rotary presses and centrifuges) have been known in the art. U.S. Pat. No. 3,910,775 (Jackman) describes a method and apparatus for processing waste material in which the refuse is dewatered in a rolling mill and formed into briquettes. U.S. Pat. No. 4,496,365 (Lindemann) describes a method of producing briquettes from organic waste products, but requires the enrichment of these waste products with organic materials of high heating value, such as coal, before compressing the mixture under high pressures and exothermal heating due to chemical reaction of lime (CaO) to produce a product having the desired high heating value. Mechanical means as such can be effective to remove free (interstitial) water from organic materials, but are largely incapable of removing water from within the constituent cells of the raw organic waste, and so are incapable of reaching the lower levels of water content necessary to create a practical fuel.

It is a principal object of my invention to provide a method for the highly efficient drying of organic material and biomass to a state in which use of the end product as a solid fuel is commercially practical and economical, and to devise apparatus for carrying out the method.

SUMMARY OF THE INVENTION

According to the method of my invention, organic material is dried by the controlled application of heat which has first been generated by microbial action (partial aerobic decomposition or fermentation) acting on that very same organic material.

I have discovered that waste organic material having a moisture content as high as about 65% by weight can be dried to 20% moisture and lower by the controlled application of heat which has been generated by microbial action (fermentation or partial aerobic decomposition) of that very same organic material.

The method of my invention for drying organic waste for fuel comprises the steps of:
  (i) in a first stage of the process, carrying out fermentation of pre-blended portions of the organic material deposited sequentially into a fermentation zone (also referred to herein as the "heating zone") of a chamber;
  (ii) withdrawing hot exhaust gases generated by the fermentation of the organic waste and effecting an air-to-air heat exchange with clean ambient intake air to produce a stream of heated air for drying; and
  (iii) in a second stage of the method, sequentially moving portions of the waste material from the fermentation zone to at least one drying zone of the chamber and, distributing hot air from said stream through the material to bring it to a desired state of dryness for use as a fuel.

According to a preferred embodiment of the method, the second drying stage comprises a sequence of steps (zones) in each of which a selected portion of the heated ambient intake air is passed through the waste material, with the air flow increasing with subsequent steps as the moisture content of the waste material lessens.

In apparatus according to the invention, there is provided a dryer, comprising: an enclosed elongate tunnel having an intake end and a discharge end; a plurality of air-pervious waste conveyor receptacles; means for sequentially conveying the receptacles horizontally along the interior of the chamber; plenum seals for separating the interior portion of the tunnel immediately beneath the bottom of the moving containers into a first fermentation zone and downstream drying zones; an extractor fan and exhaust ducting for withdrawing hot exhaust gases from the first fermentation zone of the apparatus; a supply fan and intake ducting for introducing ambient air into dryer; an air-to-air heat exchanger for transferring heat from the hot exhaust gases to the air taken in by the supply fan; a feeder pipe for heated intake air from the heat exchanger; air control dampers between the feeder pipe and aeration tubes which communicate with said drying zones, for the controlled feeding of air into a space between the tunnel floor and the conveyor receptacles, so that the heated air rises through the bases of the receptacles and through material contained therein in each zone of the tunnel; and exhaust means for venting exhaust gases and spent heating air from the tunnel.

The waste conveyor receptacles are preferably generally rectangular in shape and have bottom walls congruent with the horizontal cross section of each zone, so that as a waste-containing receptacle fully enters a zone, the bottom surface of the container, the floor of the tunnel and the side wall portions form a closed space.

BRIEF DESCRIPTION OF THE DRAWING FIGURES

An embodiment of the invention will now be described by way of example with reference to the drawings, in which:

FIGS. 1A, and 1B are schematic illustrations a currently preferred apparatus for carrying out the method of the invention, from above and to either side of the apparatus, respectively;

FIG. 2A is a side elevational view of biodryer apparatus according to the invention, shown with the side walls of the tunnel removed to display internal conveyor and mixing means, the plenum over the floor of the tunnel in Zone 1 in the first stage of the apparatus and the series of plenums dividing the second stage of the apparatus into Zones 2 to 8;

FIG. 2B is an enlarged view of the air-to-air heat exchange portion of the biodryer apparatus;

FIG. 2C is an enlarged view of the discharge section of the biodryer apparatus of FIG. 2A;

Figure 3:
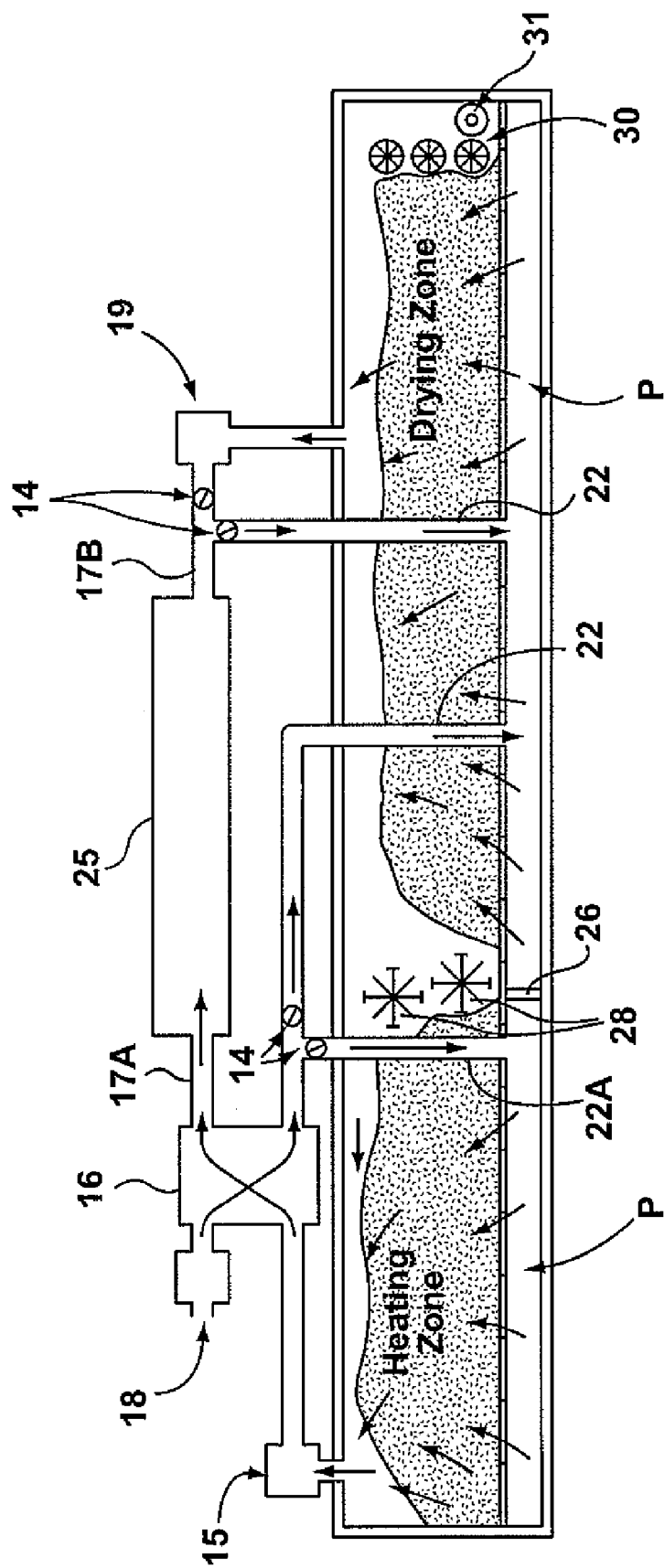

FIG. 2D is a graphical illustration of temperature of the biomass as it passes through the zones of the biodryer and the corresponding heating air supply (cubic feet per minute) along the drying tunnel; and FIG. 3 is a simplified sketch of apparatus according to the invention in vertical cross section, highlighting the flow of gas through the drying chamber and the biological waste material as the drying process proceeds.

DESCRIPTION OF PREFERRED EMBODIMENT

In apparatus according to the invention, portions of organic material are sequentially conveyed along the interior of a chamber in the form of an elongate tunnel 10 having a first, fermentation zone and sequential drying zones for the controlled application of air which has been heated by hot exhaust gases generated in the fermentation reaction. In the following discussion Zone 1 will refer to the quiescent fermentation zone of apparatus for carrying out the invention and Zone 2, Zone 3 etc. to subsequent downstream zones in which drying of the fermented organic material from Zone 1 progresses to achieve the desired state of dryness for use of the material as a fuel.

In upstream Zone 1 of the tunnel, raw organic material, typically having a moisture content of about 65%, is deposited through a tunnel loading door 12 and pre-blended. By natural microbial respiration, hot exhaust gases are produced. In this first upstream zone, the maximum biologically generated heat is created to drive off moisture and unwanted gases like VOC's and nitrogen, while limiting to the extent possible the amount of $CO_2$ produced. It is essential to minimize the oxidation of carbon in the fermenting Zone 1 material to maximize the energy content of the biofuel produced by the process. The greater the amount of carbon in the final material, the greater the energy value.

Figure 1A:
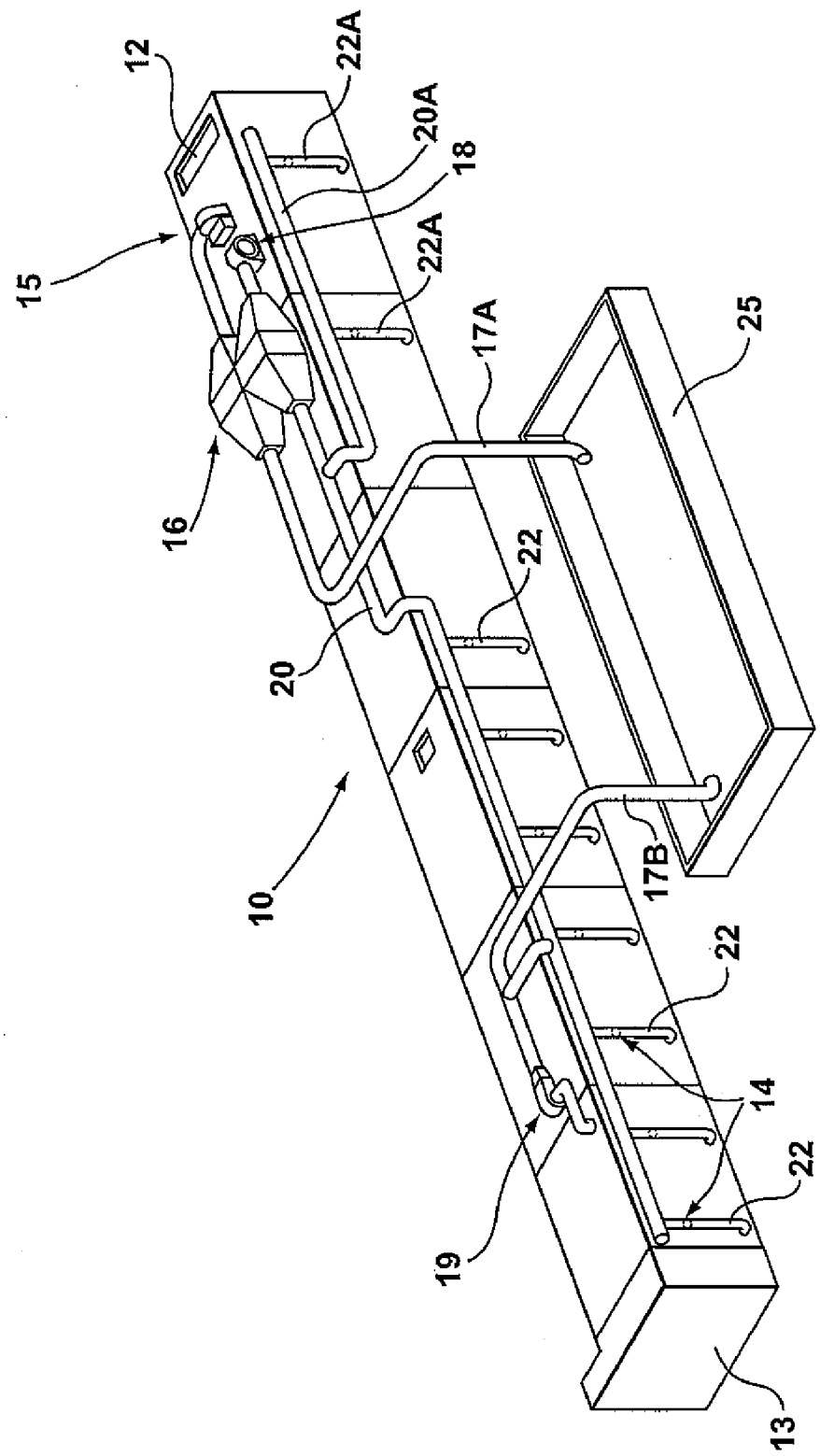
Figure 1B:
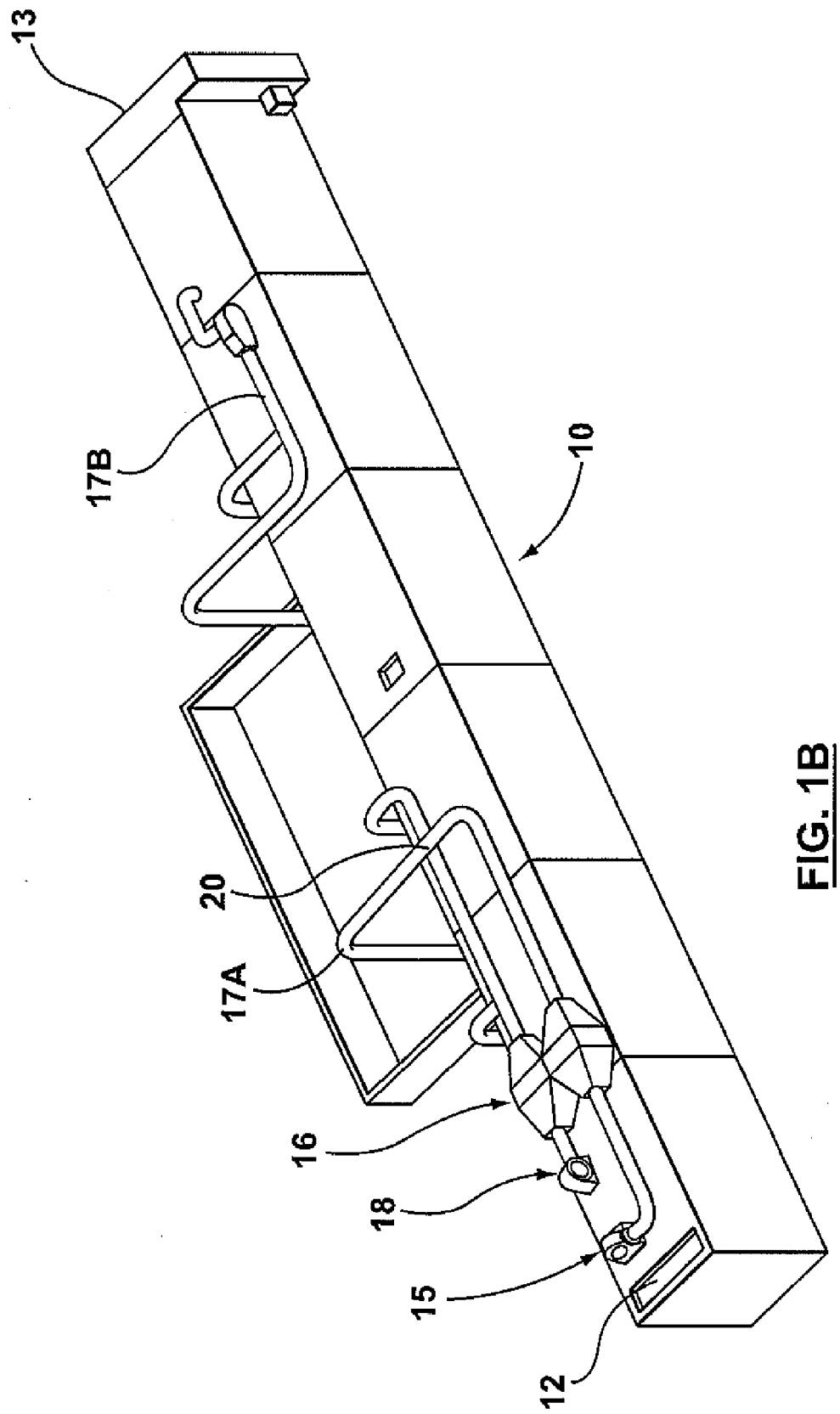

As best seen in FIGS. 1A and 2, hot gases from Zone 1 in the tunnel are extracted by extractor fan 15 and forced through an air-to-air heat exchanger 16. Thence they are exhausted through exhaust duct 17A. Downstream in the tunnel spent gases are exhausted by a second extractor fan 19 through exhaust duct 17B. Exhaust ducts 17A and 17B vent to an evaporator filter 25. An intake supply fan 18 delivers outside air to the hot side of the air-to-air heat exchanger 16 and conveys this hot air through a feeder pipe 20 to the various zones by way of branch pipes (aeration tubes) 22.

By selective adjustment of control dampers 14, which may be effected by computerized control means, hot air is conveyed to the various zones of the dryer at those percentages which will optimize the removal of moisture.

FIG. 2D is a semiquantitative graph of the controlled air supply delivered to the zones through pipes 22 to optimize drying. When a container of hot organic waste exits fermentation Zone 1 and enters Zone 2, water is already being volatilized at a high rate owing to the temperature of the material, but as a particular portion of organic waste moves along the zones, its mass temperature, i.e. the internal temperature of the biomass falls naturally, requiring that the hot air supply directed to the zones be progressively increased to maintain the drying of the mass, The best program of feeding hot air into the zones can be empirically established by temperature measurement of the biomass as it proceeds through the tunnel and appropriate control of dampers (valves) 14, to increase the drying air flow and maintain a sufficiently high temperature to dry the waste accordingly.

FIG. 3 illustrates by the arrows the flow of air through the system in operation. Air from intake (supply) fan 18 is directed by control dampers 14 into pipes 22 which feed the plenums P. Optionally, but advantageously, a portion of the heated air maybe directed back into Zone 1, as illustrated in FIG. 1A by auxiliary feeder pipe 20A which supplies branch pipes (aeration tubes) 22A extending into Zone 1 of the apparatus. The objective in cycling some of the bioheated air back into Zone 1 is to have the temperature in the fermentation zone reach as high a level as possible as quickly as possible. Circulating some of the warmed fresh air back into Zone 1, by way of branch pipes, just as for subsequent zones of the dryer, serves as a "booster".

The plenum seals 26, particularly indicated in FIG. 2, which separate the zones may be UHMW Teflon™ membranes secured perpendicularly to the bottom 11 of the tunnel 10 and to the side wall portions extending down from the bottom level 11 of the waste containers (not shown).

Advantageously, a pair of counter-rotating mixing aerator bars 28 are provided between Zone 1 and Zone 2 to maximize the porosity of the feedstock and encourage the maximum distribution of warmed air, thus aiding in the removal of moisture. As the biomass advances from Zone 1 to Zone 2 these mixing aerators agitate and displace the material. Inside the discharge end 13 of the tunnel, as illustrated in FIGS. 2C and 3, crumbler bars 30 and an auger 31 serve for removing the dried biofuel from the tunnel.

Optionally, as indicated in FIG. 2C, an auxiliary heater 32 and associated blower 33 may be used to effect any further drying that may be necessary before discharging the dried material to achieve a target moisture content significantly below 20%.

Turning to the means for conveying drying waste material through the zones of the dryer, any of a number of methods might be used for conveying portions of waste along the zones of the apparatus (coal-mine boxes with chain drives, etc.). I have found that the means for conveying waste disclosed in my U.S. Pat. No. 5,409,831 is useful in the apparatus of the present invention. The disclosure of U.S. Pat. No. 5,409,831 is incorporated herein by reference for its description of means for transferring waste materials through a tunnel shuntwise on a conveyor track in separate trays, as well as mixing means provided in the tunnel for mixing garbage positioned on the trays. In carrying out the method of the present invention it is desirable to mix the drying material as it is conveyed along tunnel 10 in order to loosen and porositize it and generally improve conditions for its heating and drying.

As noted earlier, the waste conveyor waste receptacles used (not shown) are preferably rectangular in shape and have bottom walls congruent with the horizontal cross-section of each zone, so that as each waste-containing receptacle fully enters a zone, the bottom surface of the container within plane 10A, the floor 10B of the tunnel and the side wall portions of the plenum P form a closed space feed by an associated pipe 22, as seen in FIG. 2.

Based upon my calculations on a prototype of apparatus made and used according to my invention, and using garbage conveyed onto foraminous trays along a longitudinal track within the tunnel, I have calculated that for every kW used in the drying process, biofuel having an energy content in the range of 40 kW to 50 kW can be produced.

I have also developed means for supercharging this drying process where it is possible to take advantage of landfill gas deposits located nearby, to produce low cost heat that would be mechanically distributed throughout the tunnel, reducing the time otherwise needed to dry the organic mass and thus increase the yield of biofuel produced in a given time.

Certain aspects of the invention are not limited to the particular details of the construction and arrangement as limited and it is contemplated that other modifications, variations and alterations will occur to those skilled in the art. For example, according to the method of the invention a practical low cost biofuel might be prepared by replacing Zones 2, 3, 4, 5 etc. with a single drying zone consisting of, for example, a rotary drum to which heated air from Zone 1 is conveyed and distributed through the biomaterial to facilitate drying. It is, therefore, intended that the appended claims shall cover such changes and deviations that do not depart from the true spirit and scope of this invention.

The invention claimed is:

1. A method for the continuous drying of waste organic material to produce a combustible fuel product comprising the steps of:
   (i) in a first stage of the method, carrying out aerobic decomposition of pre-blended portions of the organic material deposited sequentially into a heating zone of a chamber;
   (ii) withdrawing hot exhaust gases generated by the aerobic decomposition of the waste organic material from the heating zone thereby effecting an air-to-air heat exchange with clean ambient intake air to produce a stream of heated air for drying; and
   (iii) in a second stage of the method, sequentially moving portions of the waste organic material from the heating zone to at least one drying zone of the chamber and, distributing hot air from said stream through the material to bring it to a state of dryness having a moisture content of about 20% for use as a fuel.

2. A method as according to claim 1, wherein said decomposed portions of waste organic material are sequentially moved through a plurality of drying zones and hot air from said stream is distributed in increasing proportions from one drying zone to the next drying zone in the sequence.

3. A method according to claim 2, wherein each said portion of the waste organic material is agitated to increase its porosity while being moved from the heating zone to the first drying zone of the chamber.

4. A method according to claim 2, wherein a portion of the heated air is passed through the waste organic material in the heating zone to accelerate the attainment of higher temperatures in the heating zone.

5. A method according to claim 2, wherein said waste organic material has an initial moisture content of about 65%.

6. A method according to claim 5, wherein following steps (i) to (iii), an external source of heat is applied to the dried waste organic material to bring the moisture content below about 20%.

* * * * *